(12) United States Patent
Isaji et al.

(10) Patent No.: US 10,272,915 B2
(45) Date of Patent: Apr. 30, 2019

(54) DRIVING SUPPORT APPARATUS

(71) Applicant: DENSO CORPORATION, Kariya, Aichi-pref. (JP)

(72) Inventors: Kazuyoshi Isaji, Kariya (JP); Teppei Miyake, Kariya (JP); Minoru Okada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/474,493

(22) Filed: Mar. 30, 2017

(65) Prior Publication Data
US 2017/0282927 A1 Oct. 5, 2017

(30) Foreign Application Priority Data
Apr. 1, 2016 (JP) .................. 2016-074263

(51) Int. Cl.
| | | |
|---|---|---|
| G05D 1/02 | (2006.01) | |
| B60W 30/18 | (2012.01) | |
| B60W 50/00 | (2006.01) | |
| B60W 30/188 | (2012.01) | |
| B60W 40/114 | (2012.01) | |

(52) U.S. Cl.
CPC .... *B60W 30/18145* (2013.01); *B60W 30/188* (2013.01); *B60W 40/114* (2013.01); *B60W 50/0097* (2013.01); *G05D 1/0276* (2013.01); *B60W 2520/10* (2013.01); *B60W 2520/125* (2013.01); *B60W 2520/14* (2013.01); *B60W 2550/402* (2013.01); *B60W 2710/20* (2013.01); *B60W 2720/10* (2013.01); *B60W 2720/106* (2013.01); *G05D 1/0278* (2013.01)

(58) Field of Classification Search
CPC .......... B60W 30/18145; B60W 30/188; B60W 40/114; B60W 50/0097; B60W 2720/106; B60W 2520/14; G05D 1/0276; G05D 1/0278

See application file for complete search history.

(56) References Cited

U.S. PATENT DOCUMENTS 5,978,731 A * 11/1999 Matsuda ............ B60K 31/0058
                                          180/179
7,751,962 B2 * 7/2010 Yamamura ......... B60K 31/0066
                                          701/408
(Continued)

FOREIGN PATENT DOCUMENTS

JP          H10-19595 A     1/1998
JP          2006-146783     6/2006
(Continued)

*Primary Examiner* — Michael J Zanelli
(74) *Attorney, Agent, or Firm* — Knobbe, Martens, Olson & Bear, LLP

(57) ABSTRACT

A driving support apparatus derives position prediction data when T=Tn, which is when a predicted time Tn has elapsed from the present time, based on acquired map data, position data and speed data. Direction prediction data indicating a traveling direction of a vehicle 1 at the time T=Tn is derived based on acquired map data and derived position prediction data. A yaw angle which is an angle formed by a traveling direction D0 represented by e direction data and the traveling direction Dn represented by direction prediction data is derived. A target speed Vn of the vehicle is then derived.

7 Claims, 5 Drawing Sheets

(56) References Cited

U.S. PATENT DOCUMENTS

| | | | | |
|---|---|---|---|---|
| 8,195,371 B2 * | 6/2012 | Yasui | ................... | B60W 10/06 |
| | | | | 340/905 |
| 8,892,329 B2 * | 11/2014 | Yasui | ................. | B60W 30/146 |
| | | | | 701/72 |
| 2012/0277965 A1 * | 11/2012 | Takahashi | ........... | B60W 30/143 |
| | | | | 701/70 |

FOREIGN PATENT DOCUMENTS

| JP | 2008-059432 | 3/2008 |
|---|---|---|
| JP | 2009-040329 | 2/2009 |
| JP | 2015-217848 | 12/2015 |

* cited by examiner

DRIVING SUPPORT APPARATUS

CROSS-REFERENCE TO RELATED APPLICATION

This application is based on and claims the benefit of priority from earlier Japanese Patent Application No. 2016-74263 filed Apr. 1, 2016, the description of which is incorporated herein by reference.

TECHNICAL FIELD

The present disclosure relates to a driving support apparatus mounted on a vehicle.

BACKGROUND

As a driving support apparatus mounted on a vehicle and supporting a driving by a driver of the vehicle, a driving support apparatus that notifies to the driver of the vehicle or decelerates the vehicle prior to entering a curve ahead of the vehicle that has been detected during traveling of the vehicle.

A configuration disclosed in Japanese Patent Application Laid-Open Publication No. H10-19595 derives a safe stopping distance of a vehicle according to a vehicle speed and road surface condition, and compares a current position of the vehicle acquired from a GPS receiver with road data obtained from a map database.

By this comparison, it is determined whether or not a curve exists within the derived safe stopping distance.

When it is determined that the curve exists, the road data from the map database is searched for a portion having the largest curvature.

Then, an output of an alarm or a deceleration control is performed based on an appropriate vehicle speed before entering the portion having the largest curvature.

In other words, as described in Publication No. H10-19595, when a curve exists in a predetermined section in front of the traveling vehicle, a part of the maximum curvature is detected from the road data included in the map database, and the proper vehicle speed at which the vehicle can turn safely is obtained.

Then, the output of the alarm as a notification to the driver or the deceleration control of the vehicle is performed so that the vehicle speed becomes appropriate prior to entering the first curve.

However, the curvature of the curve is required to obtain the proper speed of the own vehicle with the configuration disclosed in Publication No. H10-19595 and the curvature of the curve is acquired from the road data included in the map database.

For this reason, highly accurate map data is required to obtain the curvature of the curve.

SUMMARY

An embodiment provides a driving support apparatus capable of obtaining an appropriate speed for turning at a curve safely without using highly accurate map data.

An aspect of a driving support apparatus mounted on a vehicle includes a map data acquisition unit that acquires map data representing a road on which the vehicle can travel, a position data acquisition unit that acquires position data representing a position of the vehicle, a speed data acquisition unit that acquires speed data representing a speed of the vehicle, a direction data acquisition unit that acquires direction data representing a traveling direction of the vehicle, a position data prediction unit that derives position prediction data representing a position of the vehicle when a predetermined predicted time has elapsed based on map data, position data and speed data, a direction data prediction unit that derives direction prediction data representing another traveling direction of the vehicle when the predicted time has elapsed based on map data and position prediction data, and a target speed derivation unit that derives a target speed of the vehicle when the predicted time has elapsed based on the traveling direction indicated by direction data and the other traveling direction indicated by direction prediction data.

According to such a configuration, since the yaw angle which is an angle formed by the current traveling direction of the vehicle and the other traveling direction of the vehicle when the predicted time has elapsed is derived and the target speed is derived based on the yaw angle, the target speed can be derived without requiring a curvature of a curve.

Therefore, it is possible to provide a driving support apparatus capable of deriving a proper target speed even when highly accurate map data is not used.

DETAILED DESCRIPTION OF THE PREFERRED EMBODIMENT

Hereinafter, an exemplary embodiment of the present disclosure will be described with reference to the drawings.

1. Configurations

Figure 1:
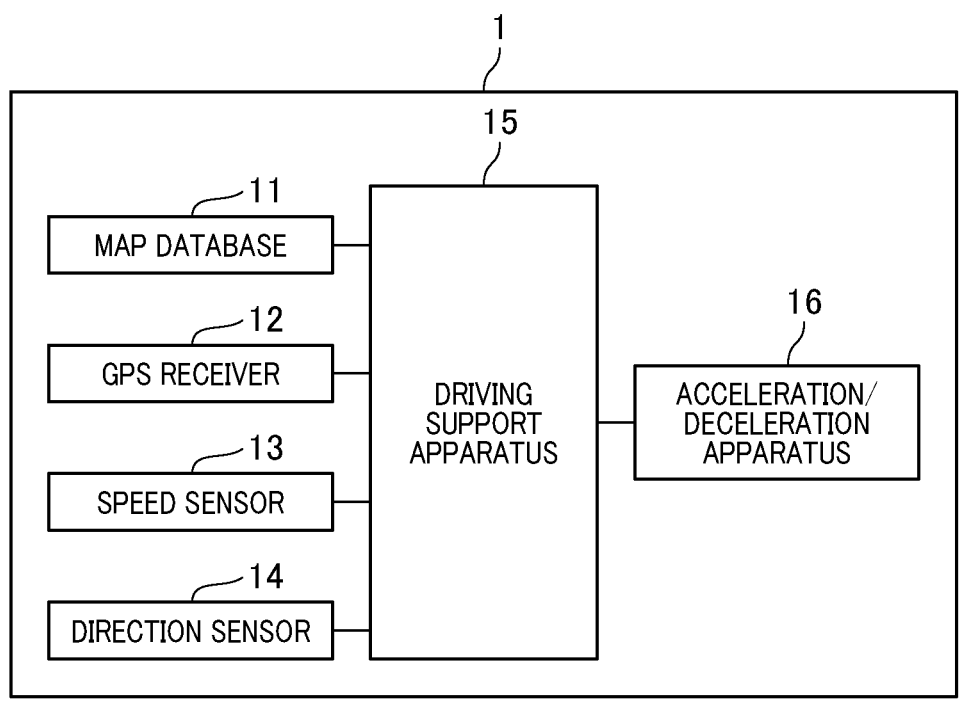
FIG. 1 shows a block diagram of a configuration of a device in a vehicle according to an embodiment.

A vehicle 1 shown in FIG. 1 is provided with a map database 11, a GPS receiver 12, a speed sensor 13, a direction sensor 14, a driving support apparatus 15, and an acceleration/deceleration apparatus 16.

The map database 11 stores map data representing roads on which the vehicle 1 can travel as map data for use in normal navigation.

The GPS receiver 12 is a device that receives transmission waves from an artificial satellite for GPS via a GPS antenna.

The GPS receiver 12 measures an absolute position of the vehicle 1 and outputs the measured absolute position as position data to the driving support apparatus 15.

The speed sensor 13 is a sensor for measuring the speed of the vehicle 1 and outputs the speed of the vehicle 1 to the driving support apparatus 15 as speed data.

Specifically, the speed sensor 13 measures the speed by detecting a rotation of an axle by an optical method or a magnetic method, and by generating a pulse signal according to the number of rotations of a wheel.

The direction sensor 14 is a sensor for measuring a traveling direction of the vehicle 1 and outputs the traveling direction of the vehicle 1 to the driving support apparatus 15 as direction data.

The direction sensor 14 is a sensor for detecting the geomagnetism and calculates the direction.

The driving support apparatus 15 is an apparatus provided with a microcomputer including a CPU, a ROM, a RAM, and the like as components, performs processing for supporting the driver's operation of the vehicle 1, and executes a speed control of the vehicle 1.

Figure 2:
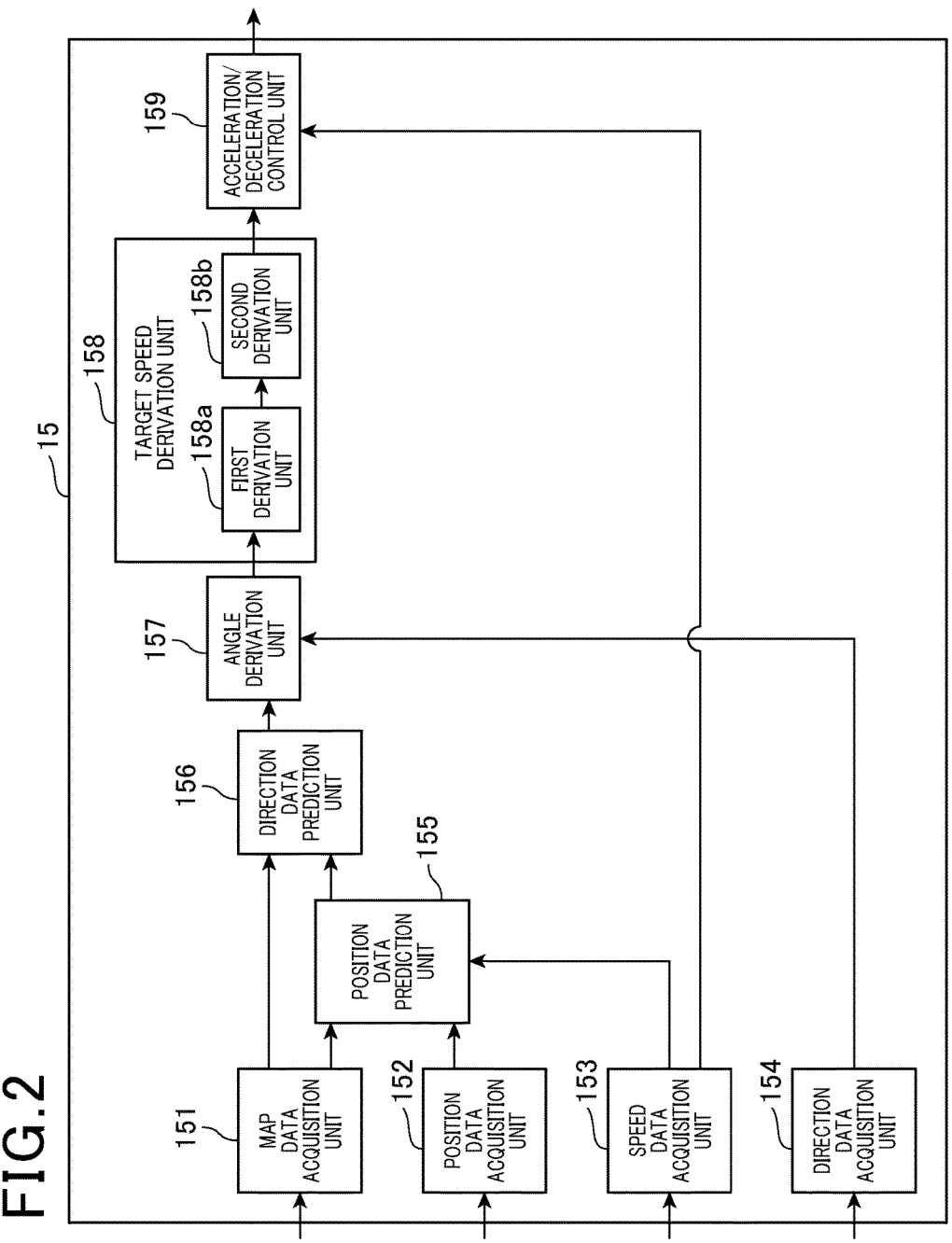
FIG. 2 shows a block diagram of a configuration inside a driving support apparatus according to the embodiment.

The driving support apparatus 15 functions as a apparatus having virtual components shown in FIG. 2 by the CPU executing the program stored in the ROM.

As shown in FIG. 2, the driving support apparatus 15 is provided with a map data acquisition unit 151, a position data acquisition unit 152, a speed data acquisition unit 153, a direction data acquisition unit 154, a position data prediction unit 155, a direction data prediction unit 156, an angle derivation unit 157, a target speed derivation unit 158, and an acceleration/deceleration control unit 159.

The driving support apparatus 15 performs driving support processing by executing the program shown in FIG. 3 which will be described later.

The map data acquisition unit 151 acquires map data from the map database 11.

The position data acquisition unit 152 acquires position data representing the absolute position (x0, y0) of the vehicle 1 at the present time from the GPS receiver 12.

It should be noted that the "present time" in the above and the following description is the time as a reference in performing calculation, and it is the time at time T=0.

The speed data acquisition unit 153 acquires speed data representing a speed V0 of the vehicle 1 at the present time from the speed sensor 13.

The direction data acquisition unit 154 acquires direction data representing the traveling direction D0 of the vehicle 1 at the present time from the direction sensor 14.

The position data prediction unit 155 derives a point in time at which a predetermined predicted time Tn has elapsed from the present time based on the map data, the position data and the speed data.

That is, position prediction data indicating the position (xn, yn) at which the vehicle 1 is predicted to be traveling at the time T=Tn is derived.

The predicted time Tn mentioned here is set to a time which is sufficiently long for the vehicle 1 before entering a curve and not too long, and is set to several seconds to several tens of seconds, for example.

The direction data prediction unit 156 derives direction prediction data representing a traveling direction Dn of the vehicle 1 at the time T=Tn based on the map data and the position prediction data.

The angle derivation unit 157 derives a yaw angle θ which is an angle formed by the traveling direction D0 represented by the direction data and the traveling direction Dn represented by the direction prediction data.

The target speed derivation unit 158 includes a first derivation unit 158a and a second derivation unit 158b.

The first derivation unit 158a derives a predicted yaw rate Rn representing a yaw rate of the vehicle 1 at the time T=Tn, based on the yaw angle θ and the predicted time Tn.

The second derivation unit 158b derives a target speed Vn of the vehicle 1 based on a set lateral acceleration L and the predicted yaw rate Rn.

The set lateral acceleration L here is a value set for a lateral acceleration which is an acceleration applied in the lateral direction of the vehicle 1, and is an upper limit value of the lateral acceleration for the vehicle 1 to safely turn the curve.

The acceleration/deceleration control unit 159 derives a time point at which a curve entry time Ts has elapsed from the present time based on a difference between the target speed Vn and the speed V0.

That is, a target acceleration/deceleration speed At of the vehicle 1 necessary for the speed of the vehicle 1 to reach the target speed Vn at the time T=Ts is derived.

Then, the acceleration/deceleration control unit 159 controls the acceleration/deceleration apparatus 16 of the vehicle 1 based on the derived target acceleration/deceleration speed At.

The curve entry time Ts here is a time until the vehicle 1 reaches a curve predicted to be traveling at the time T=Tn, and is obtained from the map data, the absolute position (x0, y0) and the speed V0.

Specifically, a starting point of the curve is specified based on the map data, and a value obtained by dividing a distance from the absolute position (x0, y0) to the starting point of the curve by the speed V0 is derived as the curve entry time.

Returning to FIG. 1, the acceleration/deceleration apparatus 16 is provided with a throttle actuator, a speed changing actuator, a brake actuator, and the like (all not shown), and performs acceleration/deceleration of the vehicle 1 according to a control by the acceleration/deceleration control unit 159 of the driving support apparatus 15.

2. Processing

Figure 3:
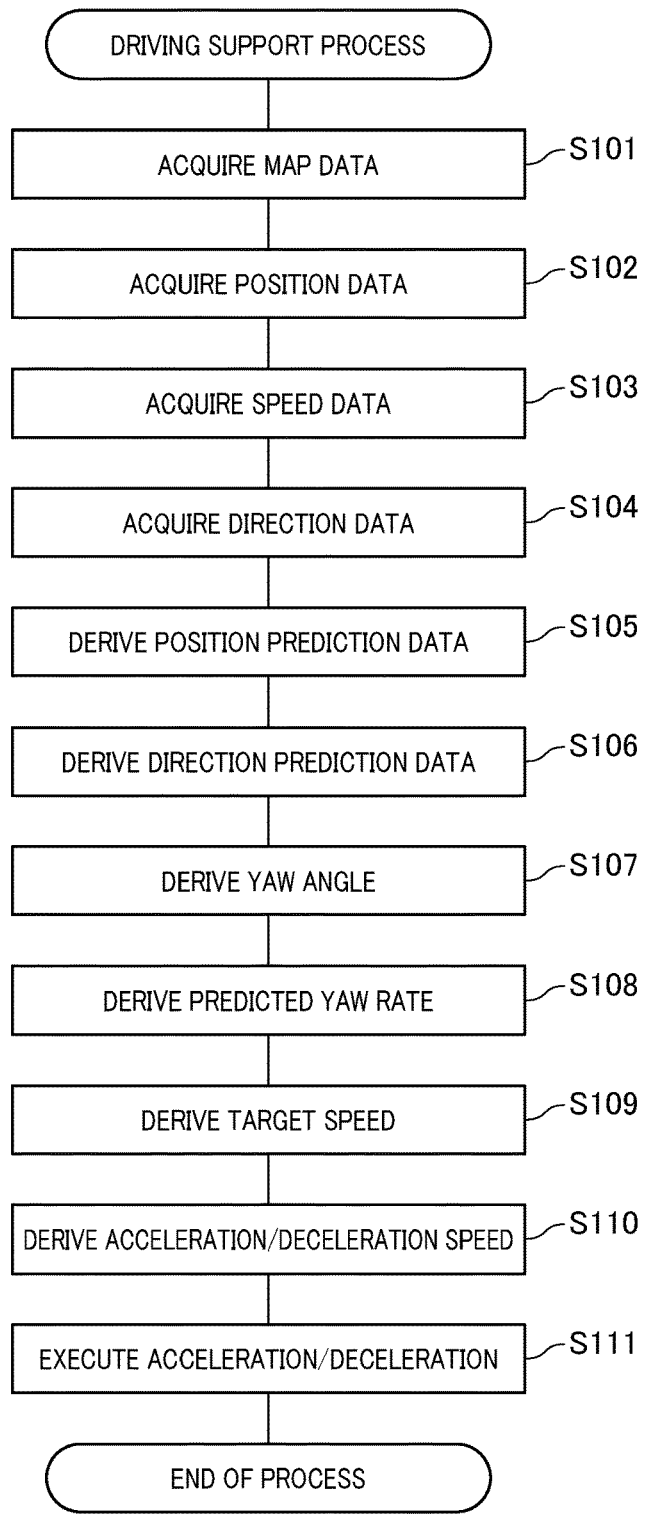
FIG. 3 shows a flowchart of a driving support processing according to the embodiment.

The driving support processing performed by the driving support apparatus 15 shown in the flowchart of FIG. 3 is periodically executed while an ignition switch of the vehicle 1 is being turned on.

In step S101, the driving support apparatus 15 acquires map data representing a road ahead of the vehicle 1 from the map database 11.

Step S101 corresponds to the process that the map data acquisition unit 151 performs.

Figure 4:
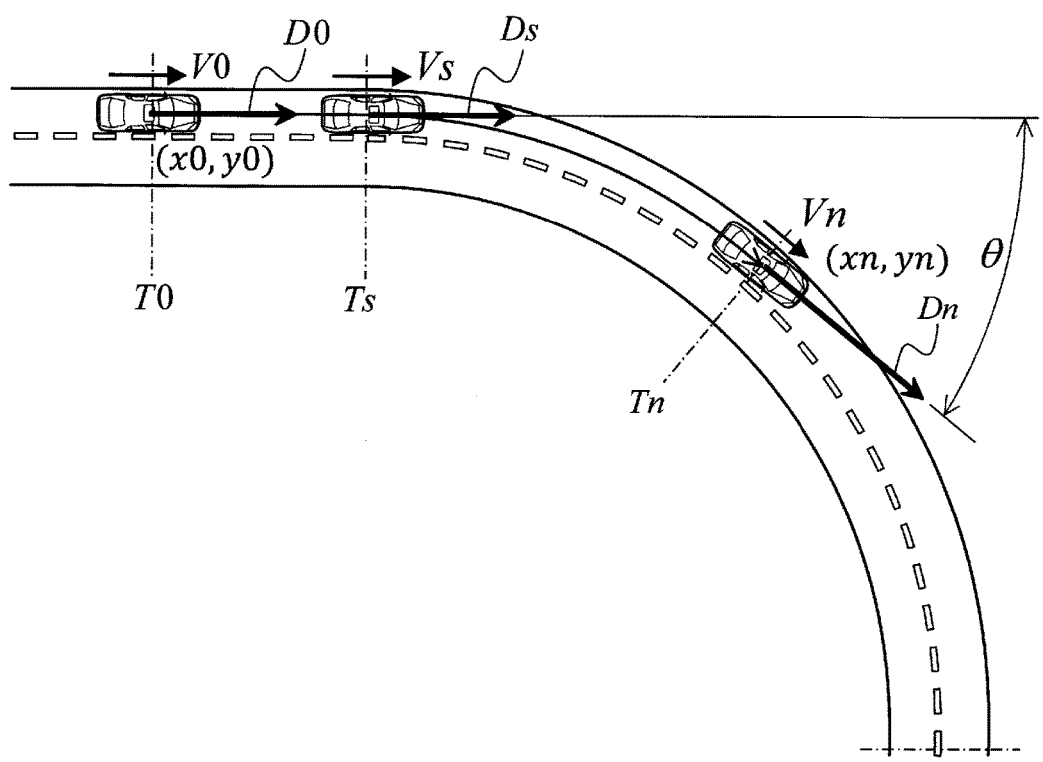
FIG. 4 shows a specific example of the driving support processing according to the embodiment.

For example, map data representing a road as shown in FIG. 4 is acquired.

In step S102, the driving support apparatus 15 acquires position data from the GPS receiver 12.

Step S102 corresponds to the process that the position data acquiring unit 152 performs.

For example, position data representing the absolute position (x0, y0) at the present time as shown in FIG. 4 is acquired In step S103, the driving support apparatus 15 acquires speed data from the speed sensor 13.

Step S103 corresponds to the process that the speed data acquisition unit 153 performs.

For example, speed data representing the current speed V0 as shown in FIG. 4 is acquired.

In step S104, the driving support apparatus 15 acquires direction data from the direction sensor 14.

Step S104 corresponds to the process that the direction data acquisition unit 154 performs.

For example, direction data representing the current direction D0 as shown in FIG. 4 is acquired.

In step S105, the driving support apparatus 15 derives position prediction data representing the position of the vehicle 1 at the time T=Tn based on the acquired map data, position data and speed data.

Step S105 corresponds to the process that the position data prediction unit 155 performs.

For example, position prediction data representing the position (xn, yn) as shown in FIG. 4 is derived.

The position (xn, yn) mentioned here is a position at which it is predicted that the vehicle 1 is traveling at the time T=Tn, and is obtained from the map data, the absolute position (x0, y0) and the speed V0.

Specifically, it is derived from the absolute position (x0, y0) by specifying a position on the road represented by the map data in a case where the vehicle 1 has advanced to the point of time T=Tn with the speed V0.

In step S106, the driving support apparatus 15 derives direction prediction data indicating the traveling direction of the vehicle 1 at the time T=Tn based on acquired map data and derived position prediction data.

Step S106 corresponds to the process that the direction data prediction unit 156 performs.

For example, based on the traveling direction of the vehicle 1 specified from the road information represented by map data, which is a tangential direction of the road at the position (xn, yn) as shown in FIG. 4, it is derived as direction prediction data representing the traveling direction of the vehicle 1 at time T=Tn.

In step S107, the driving support apparatus 15 derives a yaw angle θ which is an angle formed by the traveling direction D0 represented by the direction data and the traveling direction Dn represented by the direction prediction data.

Step S107 corresponds to the process that the angle derivation unit 157 performs.

In step S108, the driving support apparatus 15 derives the predicted yaw rate Rn based on the predicted time Tn and the derived derivation yaw angle θ.

Step S108 corresponds to the process that the first derivation unit 158a of the target speed derivation unit 158 performs.

For example, the predicted yaw rate Rn is derived by the following Formula 1.

$$Rn = \theta/Tn \quad \text{Formula 1}$$

In step S109, the driving support apparatus 15 derives the target speed Vn of the vehicle 1 based on the set lateral acceleration L and the predicted yaw rate Rn.

Step S109 corresponds to the process that the second derivation unit 158b of the target speed derivation unit 158 performs.

For example, the target speed Vn is derived by the following Formula 2.

$$Vn = L/Rn \quad \text{Formula 2}$$

In step S110, the driving support apparatus 15 derives the target acceleration/deceleration speed At of the vehicle 1 necessary for the speed of the vehicle 1 to reach the target speed Vn at the time T=Ts based on the difference between the target speed Vn and the speed V0.

For example, the target acceleration/deceleration speed At is derived by the following Formula 3.

$$At = f((Vn-V0)/Ts) \quad \text{Formula 3}$$

Note that f((Vn−V0)/Ts) is a function of (Vn−V0)/Ts, and various relational expressions are conceivable.

Step S110 corresponds to the process that the acceleration/deceleration derivation unit performs.

For example, it is the target acceleration/deceleration speed At such that the speed of the vehicle 1 becomes Vs at the time T=Ts as shown in FIG. 4.

Figure 5:
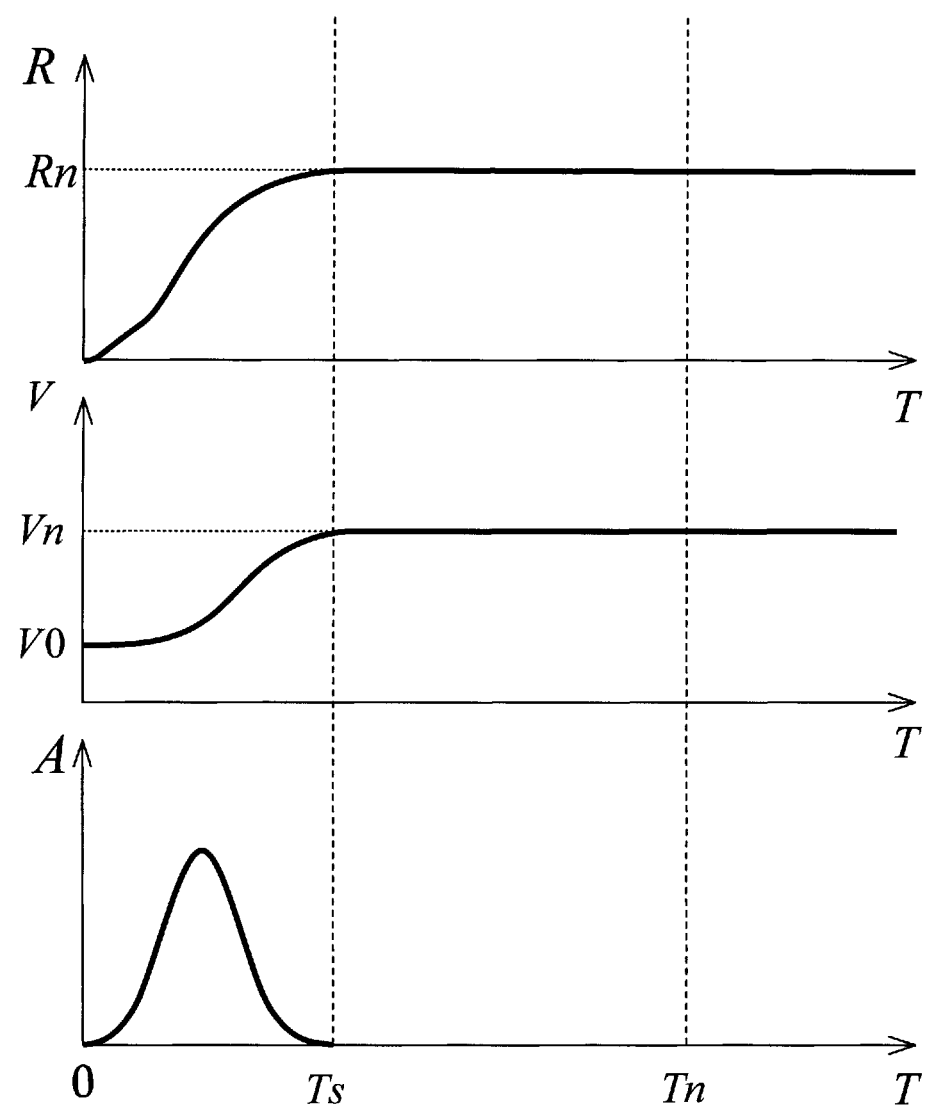
FIG. 5 shows graphs representing each parameter in a case of performing the driving support processing according to the embodiment.

At this time, as shown in FIG. 5, for example, the yaw rate R, the speed V, and the acceleration/deceleration A of the vehicle 1 change.

That is, at the time T=Ts, the target acceleration/deceleration speed At is derived so as to be the predicted yaw rate Rn and the target speed Vn.

In step S111, the driving support apparatus 15 controls the acceleration/deceleration apparatus 16 of the vehicle 1 based on the derived target acceleration/deceleration speed At.

Step S111 corresponds to the process that the acceleration/deceleration control unit 159 performs.

3. Effects

According to the embodiment detailed above, the following effects can be obtained.

(1a) According to the driving support apparatus 15 of the present embodiment, since an appropriate target speed Vn can be derived, the acceleration/deceleration control can be performed appropriately even when highly accurate map data is not used to the extent that the curvature of the curve can be recognized.

That is, as described above, the target speed Vn is obtained from the set lateral acceleration L and the predicted yaw rate Rn.

The set lateral acceleration L is a set value, and the predicted yaw rate Rn is derived based on the predicted time Tn and the yaw angle θ, and can be obtained without depending on the curvature of the curve.

That is, the target speed Vn can be derived without using the curvature of the curve.

Further, the acceleration/deceleration control is performed by obtaining the target acceleration/deceleration speed At.

The target acceleration/deceleration speed At is obtained from the target speed Vn, the current speed V0, and the curve entry time Ts.

Since the current speed V0 and the curve entry time Ts are not dependent on the curvature of the curve, the target acceleration/deceleration speed At can be derived without using the curvature of the curve.

Therefore, the acceleration/deceleration control of the vehicle 1 can be performed even when the curvature of the curve is not used.

(1b) According to the driving support apparatus 15 of the present embodiment, even in a case where the degree of curvature changes in the middle of a curve, such as when the curve gradually becomes steep or gentle, the acceleration/deceleration control can be performed appropriately.

That is, as described above, the acceleration/deceleration control is performed based on the target acceleration/deceleration speed At obtained by the driving support apparatus 15.

The target acceleration/deceleration speed At varies according to the target speed Vn, and the target speed Vn varies according to the yaw angle θ.

The yaw angle θ is the angle formed by the traveling direction D0 of the vehicle 1 represented by the direction data at the time T=0 and the traveling direction Dn of the vehicle 1 represented by the direction prediction data at the time T=Tn.

Therefore, the target speed Vn can be obtained according to the degree of curvature of the road at the time T=0 and the time T=Tn regardless of a shape of the entire curve to which the vehicle 1 is approaching.

Therefore, the target speed Vn can be determined more appropriately even when the curvature changes in the middle of the curve, and thus the acceleration/deceleration control can be performed more appropriately.

4. Other Embodiments

Although the embodiment for carrying out the present disclosure has been described above, the present disclosure is not limited to the above-described embodiment, and various modifications can be made.

(2a) Although the map data acquisition unit 151 acquires map data from the map database 11 in the above embodiment, acquired map data is not limited to map data stored in advance in the map database 11.

The map data acquisition unit 151 may acquire map data by receiving map data distributed from the outside of the vehicle 1, for example.

(2b) Although the target speed Vn of the vehicle 1 is derived based on the set lateral acceleration L and the predicted yaw rate Rn in the above embodiment, a method of deriving the target speed Vn is not limited thereto.

For example, the target speed Vn corresponding to the value of the yaw angle θ may be set in advance.

(2c) Although the predicted yaw rate Rn is derived using Formula 1 in the above embodiment, the formula used for derivation is not limited thereto.

The predicted yaw rate Rn may be derived by the following Formula 4, for example.

$$Rn = \theta s / (Tn - Ts) \quad \text{Formula 4}$$

It should be noted that the yaw angle θs mentioned here is an angle formed by the traveling direction Ds of the vehicle 1 represented by the direction data at the time T=Ts and the traveling direction Dn of the vehicle 1 represented by the direction prediction data at the time T=Tn, and it is represented by θs=Dn−Ds.

Here, since θs and Tn−Ts are values not dependent on time T=0, the predicted yaw rate Rn does not depend on the timing at the time T=0 to be derived.

That is, when such a formula is used, in a case where the curve to be predicted is the same, the same predicted yaw rate Rn is derived regardless of the position at the time T=0 at which the prediction of the vehicle 1 is performed.

That is, when the curve to be predicted is the same, the same target speed Vn and the same target acceleration/deceleration speed At are derived regardless of the position at the time of the time T=0 at which the prediction is performed.

(2d) The set lateral acceleration L is not limited to one preset value and may be changeable.

For example, the value of the set lateral acceleration L may be changed according to the driver's intention.

Further, the value of the set lateral acceleration L may be calculated and changed in accordance with circumstances of the vehicle 1 such as a road surface condition or weather.

According to such a configuration, much safer traveling corresponding to the circumstances of the vehicle 1 can be obtained.

(2e) The direction data representing the traveling direction D0 of the vehicle 1 at the time T=0 is specified by acquiring the direction data from the direction sensor 14 in the above embodiment.

However, the method of specifying the traveling direction of the vehicle 1 at the present time is not limited thereto.

For example, the traveling direction of the vehicle 1 may be a direction specified from road information represented by map data, which is a road tangent direction of the road of the vehicle 1 at the time T=0, based on map data acquired from the map database 11 and position data acquired from the GPS receiver 12.

That is, the yaw angle θ can be obtained even if the direction sensor is not used.

Furthermore, with such a configuration, it is possible to acquire the traveling direction D0 of the vehicle 1 irrespective of the direction of the vehicle 1, for example.

Therefore, it is possible to obtain the yaw angle θ based on direction data of the vehicle 1 even if the direction of the vehicle 1 at the time T=0 is not parallel to the road on which the vehicle 1 is traveling.

That is, the degree of curvature of the road can be predicted even when the direction of the vehicle 1 is not parallel to the road on which the vehicle 1 is traveling at the time T=0.

As a result, it is possible to derive the target speed Vn and the target acceleration/deceleration speed At.

(2f) The driving support apparatus 15 controls the acceleration/deceleration apparatus 16 of the vehicle 1 based on the derived target acceleration/deceleration speed At in the above embodiment.

However, the control of the acceleration/deceleration apparatus 16 is not limited to that performed by the driving support apparatus 15.

For example, the driving support apparatus 15 may be configured so that notifications such as a warning or the like instruct acceleration/deceleration to the driver of the vehicle 1 based on the target speed Vn or the target acceleration/deceleration speed At, and the driver performs the acceleration/deceleration.

Although the driving support apparatus 15 derives the predicted yaw rate Rn based on the predicted time Tn and the derived derivation yaw angle θ in step S108 in the above embodiment, it is not limited thereto.

For example, the predicted yaw rate Rn may be derived based on an inner product of a direction vector corresponding to the traveling direction D0 indicated by direction data and a direction vector corresponding to the traveling direction Dn represented by direction prediction data, and the above-described predicted time Tn.

(2g) A part or all of the functions executed by the driving support apparatus 15 may be configured in hardware by one or more ICs or the like in the above embodiment.

(2h) A plurality of functions possessed by one component in the above embodiment may be realized by a plurality of components, or one function possessed by one component may be realized by a plurality of components.

In addition, a plurality of functions of a plurality of components may be realized by one component, or one function realized by a plurality of components may be realized by one component.

Further, a part of the configuration of the above embodiment may be omitted.

Furthermore, at least a part of the configuration of the above embodiment may be added or replaced with the other configuration of the embodiment described above.

It should be noted that all aspects included in the technical concept specified only by the language described in the claims are embodiments of the present disclosure.

(2i) The present disclosure is applicable not only to the above-described driving support apparatus 15 but also to an in-vehicle system including the driving support apparatus 15 as a component, a program for making a computer function as the driving support apparatus 15, a non-transitory entity recording medium such as a semiconductor memory to which the program is stored, a driving support method, and the like.

What is claimed is:

1. A driving support apparatus mounted on a vehicle comprising:
    a map data acquisition unit that acquires map data representing a road on which the vehicle can travel;
    a position data acquisition unit that acquires position data representing a position of the vehicle;
    a speed data acquisition unit that acquires speed data representing a speed of the vehicle;
    a direction data acquisition unit that acquires direction data representing a traveling direction of the vehicle;
    a position data prediction unit that derives position prediction data representing a position of the vehicle when a predetermined predicted time has elapsed based on map data, position data and speed data;
    a direction data prediction unit that derives direction prediction data representing another traveling direction of the vehicle when the predicted time has elapsed based on map data and position prediction data;
    a target speed derivation unit that derives a target speed of the vehicle when the predicted time has elapsed based on the traveling direction indicated by direction data and the other traveling direction indicated by direction prediction data; and
    an acceleration/deceleration control unit that derives an acceleration/deceleration speed of the vehicle necessary for the vehicle to reach the target speed when the predicted time has elapsed based on the difference between the target speed and the speed indicated by the speed data, and executes a process of accelerating/decelerating the vehicle based on the derived acceleration/deceleration speed.

2. The driving support apparatus according to claim 1, wherein,
    the target speed derivation unit includes first derivation unit that derives a predicted yaw rate representing a yaw rate of the vehicle when the predicted time has elapsed based on the traveling direction indicated by the direction data, the other traveling direction indicated by the direction prediction data, and the predicted time; and
    a second derivation unit that derives the target speed based on a set lateral acceleration which is a preset value of a lateral acceleration applied in the lateral direction of the vehicle and the predicted yaw rate.

3. The driving support apparatus according to claim 2, wherein,
    the driving support apparatus further includes an acceleration/deceleration control unit that derives an acceleration/deceleration speed of the vehicle necessary for the vehicle to reach the target speed when the predicted time has elapsed based on the difference between the target speed and the speed indicated by the speed data, and executes a process of accelerating/decelerating the vehicle based on the derived acceleration/deceleration speed.

4. The driving support apparatus according to claim 3, wherein,
    the driving support apparatus further includes an angle derivation unit that derives a yaw angle which is an angle formed by the traveling direction indicated by direction data and the other traveling direction indicated by direction prediction data; and
    the target speed derivation unit derives the target speed of the vehicle when the predicted time has elapsed based on the yaw angle.

5. The driving support apparatus according to claim 2, wherein,
    the driving support apparatus further includes an angle derivation unit that derives a yaw angle which is an angle formed by the traveling direction indicated by direction data and the other traveling direction indicated by direction prediction data; and
    the target speed derivation unit derives the target speed of the vehicle when the predicted time has elapsed based on the yaw angle.

6. The driving support apparatus according to claim 1, wherein,
    the driving support apparatus further includes an angle derivation unit that derives a yaw angle which is an angle formed by the traveling direction indicated by direction data and the other traveling direction indicated by direction prediction data; and
    the target speed derivation unit derives the target speed of the vehicle when the predicted time has elapsed based on the yaw angle.

7. The driving support apparatus according to claim 1, wherein,
    the driving support apparatus further includes an angle derivation unit that derives a yaw angle which is an angle formed by the traveling direction indicated by direction data and the other traveling direction indicated by direction prediction data; and
    the target speed derivation unit derives the target speed of the vehicle when the predicted time has elapsed based on the yaw angle.

* * * * *